US005756594A

United States Patent [19]

Funhoff et al.

[11] Patent Number: 5,756,594
[45] Date of Patent: May 26, 1998

[54] POLYMERS CONTAINING POLYACETAL BLOCKS, THEIR PREPARATION AND THEIR USE

[75] Inventors: Angelika Funhoff, Heidelberg; Dieter Boeckh, Limburgerhof; Matthias Kroner, Eisenberg; Richard Baur, Mutterstadt; Alexander Kud, Eppelsheim; Gunnar Schornick, Neuleiningen; Volker Schwendemann, Neustadt, all of Germany

[73] Assignee: BASF Aktiengesellschaft, Ludwigshafen, Germany

[21] Appl. No.: 934,084

[22] Filed: Sep. 19, 1997

Related U.S. Application Data

[63] Continuation of Ser. No. 513,799, PCT/EP94/00535 filed on Feb. 25, 1994, abandoned.

[30] Foreign Application Priority Data

Mar. 6, 1993 [DE] Germany ............ 43 07 112.0

[51] Int. Cl.[6] .................................................... C08G 2/30
[52] U.S. Cl. .............. 525/400; 525/398; 525/401; 528/230; 528/249; 528/250; 528/267; 528/266; 528/269; 528/270; 252/174.24; 510/476
[58] Field of Search ................... 525/400, 398, 525/401; 528/230, 249, 250, 267, 266, 269, 270; 252/174.24; 510/476

[56] References Cited

U.S. PATENT DOCUMENTS

| 4,146,495 | 3/1979 | Crutchfield et al. | 252/89 R |
| 4,315,092 | 2/1982 | Crutchfield et al. | 528/230 |
| 4,713,441 | 12/1987 | Heller et al. | 528/392 |

FOREIGN PATENT DOCUMENTS

| 0 001 004 | 8/1978 | European Pat. Off. . |
| 001 004 | 3/1979 | European Pat. Off. . |
| WO 92/15629 | 9/1992 | WIPO . |
| 92/15629 | 12/1992 | WIPO . |

OTHER PUBLICATIONS

Journal of Polymer Science, vol. 18, 1980, pp. 293 through 297.

*Primary Examiner*—Margaret W. Glass
*Attorney, Agent, or Firm*—Oblon, Spivak, McClelland, Maier & Neustadt, P.C.

[57] ABSTRACT

Polymers which contain polyacetal blocks are obtainable by polymerizing carboxylates containing aldehyde groups in the presence of initiators and reacting the polymers with at least bifunctional crosslinking agents in the presence of acids or Lewis acids and, if required hydrolyzing the ester groups present as polymerized units, process for the preparation of the polymers containing polyacetal blocks by polymerizing carboxylates containing aldehyde groups in the presence of initiators and reacting the resulting polyacetals containing terminal hydroxyl groups with at least bifunctional crosslinking agents in the presence of acids or Lewis acids, and the use of the resulting polymers as additives in phosphate-free and reduced phosphate detergents and cleaning agents, as scale inhibitors and as dispersants for pigments.

16 Claims, No Drawings

POLYMERS CONTAINING POLYACETAL BLOCKS, THEIR PREPARATION AND THEIR USE

This application is a continuation of application Ser. No. 08/513,799, filed on Sep. 6, 1995, now abandoned, which was originally filed as International Application No. PCT/EP94/00535, filed on Feb. 25, 1994. The present invention relates to polymers containing polyacetal blocks, processes for their preparation and their use as additives in phosphate-free and reduced-phosphate detergents and cleaning agents, as scale inhibitors and as dispersants for pigments.

EP-B 0 001 004 discloses polymeric acetal carboxylates which are obtainable by polymerizing glyoxylates in the presence of initiators. These polymers contain at least 4 units of the formula

where M is an alkali metal, ammonium, $C_1$–$C_4$-alkyl or alkanolamine group. These polymers are used in amounts of at least 1% by weight as builders in detergents. The known polymeric acetal carboxylates hydrolyze relatively rapidly in an acidic medium with formation of components which are biodegradable. The polymers are prepared by polymerizing glyoxylates using suitable initiators, such as strong Lewis acids or sodium diethylmethylmalonate. The resulting polymers have terminal OH groups. In order to stabilize the polymers so that they are sufficiently stable when used in detergents, the terminal groups are blocked, for example by reaction with ethyl vinyl ether or ethylene oxide.

WO/A-92/15629 discloses polyacetals which contain units of the formula

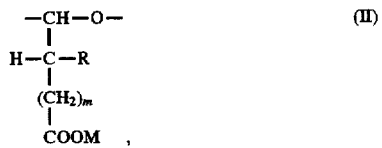

where
R is H, $C_1$–$C_4$-alkyl or COOM,
M is H, $C_1$–$C_4$-alkyl or an alkali metal, ammonium or alkanol-amine group
$R^2$ is $C_1$–$C4$-alkyl and
m is from 0 to 9.

They are prepared by polymerizing the parent monomers in the presence of initiators and, if required, hydrolyzing the ester groups of the polymer with alkali metal bases, ammonia or alkanolamines.

J. Polym. Sci.: Polymer Letters Edition, 18 (1980), 293–297 discloses the preparation of polyacetals by an acid-catalyzed addition reaction of polyols with divinyl ether. Thus, a polyacetal having a molecular weight of 200,000 is obtained, for example, by polyaddition of trans-1,4-cyclohexanedimethanol with butanediol divinyl ether under the catalytic action of p-toluenesulfonic acid. The polyacetals described are used in medicine for the controlled release of active compounds.

It is an object of the present invention to provide novel substances and additives for detergents and cleaning agents, and novel scale inhibitors and dispersants.

We have found that this object is achieved by polymers which contain polyacetal blocks and are obtainable by polymerizing carboxylates containing aldehyde groups, if required together with up to 50 mol % of copolymerizable monomers, in the presence of initiators, and reacting the polymers with at least bifunctional crosslinking agents in the presence of acids or Lewis acids and, if required, hydrolyzing the ester groups present as polymerized units.

The polymers are obtained by polymerizing carboxylates containing aldehyde groups, in the presence or absence of monomers copolymerizable therewith and in the presence of initiators, and reacting the resulting polymers with at least bifunctional crosslinking agents in the presence of acids or Lewis acids. The resulting polymers containing polyacetal blocks are used as additives in phosphate-free and reduced-phosphate detergents and cleaning agents, as scale inhibitors and as dispersants for pigments.

Carboxylates containing aldehyde groups are, for example, glyoxylates which are obtainable by esterifying glyoxylic acid with $C_1$–$C_{20}$-alcohols, for example methyl glyoxylate, ethyl glyoxylate, n-propyl glyoxylate, isopropyl glyoxylate, n-butyl glyoxylate, isobutyl glyoxylate, stearyl glyoxylate and palmityl glyoxylate. The use of methyl glyoxylate and ethyl glyoxylate is particularly preferred. The carboxylates containing aldehyde groups include the formyl esters of the formula III, stated above in connection with the prior art. These esters may be prepared, for example, by hydroformylation of monoethylenically unsaturated carboxylates with carbon monoxide and hydrogen at elevated temperatures and pressures (cf. for example J. Falbe, New Synthesis with Carbon Monoxide, Springer Verlag 1980, or J. Wender and P. Pino, Organic Synthesis via Metal Carbonyls, J. Wiley & Sons, 1977). Preferably used formyl-containing carboxylates of the formula II are compounds in which
R is H or COOM,
m is from 0 to 2 and
M is methyl, ethyl, Na, K, ammonium or the ethanolamine group.

The glyoxylates and the compounds of the formula III may be copolymerized as a mixture with up to 50, preferably up to 30, mol % of at least one comonomer selected from the group consisting of the $C_1$–$C_{10}$-aldehydes, $C_2$–$C_4$-alkylene oxides, epihalohydrins, cyclic formals derived from diols or cyclic polymers of formaldehyde and epoxysuccinic acid.

The polymerization is carried out in the absence of a solvent or in a solvent (cf. EP-B-0 001 004). Suitable solvents are, for example, halohydrocarbons, such as dichloromethane and trichloroethane, aromatic hydrocarbons, such as benzene, toluene, isopropylbenzene and xylene, ethers, such as diethyl ether, dioxane, tetrahydrofuran and diethylene glycol dimethyl ether, and dimethylformamide and acetonitrile. Preferably used solvents are ether, acetonitrile and dichloromethane. The solvents should be anhydrous or substantially anhydrous. The monomers, too, should be anhydrous. It is advisable to purify them by distillation before the polymerization. The water content of the polymerizing mixture is usually below 0.1% by weight. The polymerization is preferably carried out under an inert gas atmosphere, for example under nitrogen, argon, helium or neon.

Suitable initiators are, for example, amines, such as triethylamine or the 2-hydroxypyridine-$H_2O$ complex, strong Lewis acids, such as boron trifluoride or boron trifluoride etherates, antimony pentafluoride, phosphorus pentafluoride, phosphorus pentoxide, tin chloride, tin alkyls, titanium halides and titanium alkyls, trifluoroacetic acid, alkali metal alcoholates, butyllithium, Grignard compounds, potassium carbonate, sodium diethylmalonate, sodium dimethylmalonate and sodium diethylmethylmalonate. The polymerization may furthermore be carried out in the presence of small amounts of hydroxyl and cyanide ions. The initiators are used in amounts of from 0.0001 to 15, preferably from 0.0001 to 5, % by weight. Preferred polymerization initiators for the preparation of the polyacetals are boron trifluoride etherate, sodium diethylmethylmalonate and triethylamine.

In order to initiate the polymerization, monomers, initiator and, if required, the solvent are mixed. The polymerization is preferably carried out in the absence of water under an inert gas atmosphere, for example under helium, argon or nitrogen. The substances may be mixed in any order, batchwise or continuously. The polymerization is usually carried out at from −100° to 100° C., preferably from −70° to +80° C., particularly preferably from −20° to +30° C. The polymerization takes from a few minutes to a few days, depending on the temperature and the initiator. If the monomers are polymerized in a solvent, the concentration of the monomers therein is usually from 5 to 95, preferably from 15 to 90, % by weight.

In the case of the polymerization of the carboxylates containing aldehyde groups, polyacetals which have terminal OH groups are formed. These polymers may be isolated or may be reacted directly with at least bifunctional crosslinking agents in the presence of acids or Lewis acids. Here, the polyacetals containing terminal OH groups are linked to give polymers having higher molecular weights. The increase in molecular weight may be demonstrated, for example, by means of the K value of the polymers. Thus, a polymer containing polyglyoxy acetate blocks and having a K value of 42 is formed, for example, from a poly (methylglyoxylate) having a K value of 25 after reaction with a divinyl ether.

Suitable crosslinking agents which are at least bifunctional are di- and polyvinyl ethers, which are obtainable, for example, by vinylation of diols or trihydric and polyhydric alcohols. Examples of suitable divinyl ethers are ethylene glycol divinyl ether, propylene glycol divinyl ether, butanediol divinyl ether, butynediol divinyl ether, butenediol divinyl ether, hexanediol divinyl ether, bis(hydroxymethyl) cyclohexane divinyl ether, diethylene glycol divinyl ether, triethylene glycol divinyl ether, tetraethylene glycol divinyl ether and divinyl ethers of polyethylene glycols where the polyethylene glycol has a molecular weight of up to 20,000, polypropylene glycol divinyl ethers having molecular weights of up to 10,000 and divinyl ethers of copolymers of ethylene oxide and propylene oxide having molecular weights of up to 10,000 and polytetrahydrofuran divinyl ethers.

In addition to the vinylated diols, other vinyl ethers, for example vinylated sugars, such as dianhydrous sorbitol divinyl ether, are also suitable crosslinking agents. Preferably used crosslinking agents are the following divinyl ethers: 1,4-butanediol divinyl ether, 1,6-hexanediol divinyl ether, ethylene glycol divinyl ether, diethylene glycol divinyl ether and triethylene glycol divinyl ether.

Other suitable crosslinking agents are diepoxides. Such compounds are obtainable, for example, by reacting glycols with epichlorohydrin in a molar ratio of 1 to at least 2 and treating the reaction products with bases; instead of glycol, it is possible to use polyglycols or polymers of ethylene oxide and propylene oxide for the preparation of the diepoxides. Of particular industrial interest here are polyalkylene glycols having from 2 to 40 ethylene oxide units, from which diepoxides are formed by reaction with epichlorohydrin and treatment with bases. Further suitable crosslinking agents are diesters, such as malonic diesters, benzalmalonic diesters, azelaic diesters, phthalic diesters or oxalic diesters, succinic diesters, glutaric diesters, pimelic diesters, acetylenedicarboxylic diesters, tartronic diesters, malic diesters, mesoxalic diesters, tartaric diesters, citric esters, aconitic esters, acetonedicarboxylic esters, hydroxymaleic esters, hydroxyfumaric esters and oxalic esters.

Other suitable crosslinking agents are anhydrides, for example maleic anhydride, succinic anhydride, butanetetracarboxylic dianhydride and benzene tetracarboxylic dianhydride.

Further suitable crosslinking agents are nitriles, such as adipodinitrile, succinodinitrile and glutarodinitrile.

The functionalities of the crosslinking agents may also be present in mixed form, for example an ester group and an amide group, etc. Compounds having 2 functional groups, for example acyl chloride groups, amido groups and imidoester groups, are also suitable crosslinking agents.

The polyacetal blocks having terminal OH groups and formed by polymerization of carboxylates containing aldehyde groups are reacted with the crosslinking agents which are at least bifunctional preferably in a molar ratio of from 1:2 to 1:1.001. Sufficient amounts of crosslinking agent for the reaction are amounts which convert all terminal OH groups of the polyacetal blocks. If the preparation of the polyglyoxylates was carried out in the presence of Lewis acids, linking of polyglyoxylate blocks to give polymers having a higher molecular weight takes place at as early a stage as the addition of crosslinking agents to the polymerizing mixture. If, however, the polymerization was initiated with the aid of sodium diethylmalonate, an acid or Lewis acid and a crosslinking agent which is at least bifunctional are added after the end of the polymerization of the carboxylates containing the aldehyde groups, and linking of polyglyoxylate blocks is thus achieved.

Organic or inorganic acids or acid-forming compounds are required as initiators for the reaction of polyacetals of divinyl ethers containing terminal OH groups. Suitable catalysts are, for example, $C_1$–$C_{10}$-carboxylic acids, such as formic acid, acetic acid, propionic acid, malic acid, adipic acid, tartaric acid, succinic acid, oxalic acid, citric acid or maleic acid, monohalogenated or polyhalogenated carboxylic acids, such as trifluoroacetic acid or trichloroacetic acid, hydrogen chloride, hydrogen bromide, hydrogen iodide, sulfuric acid, phosphoric acid, benzenesulfonic acid, p-toluenesulfonic acid, boric acid, ascorbic acid, acidic alumina, aluminum sulfate, potassium aluminum sulfate, iron(II) sulfate, iron(III) sulfate, boron trifluoride, boron trichloride, tin(IV) chloride, aluminum trichloride, ion exchangers in acid form and acid-laden inert solid substances. Preferably used initiators are tartaric acid, oxalic acid, trifluoroacetic acid and citric acid. Mixtures of different acids may of course also be used as catalysts. The initiators are mixed with the polyacetals containing terminal OH groups preferably at from −2° to +60° C., and the mixture is then heated to the reaction temperature. The catalyst is used in amounts from 1 ppm to 10% by weight, preferably from 10 ppm to 1% by weight. The linking of the polyacetals containing terminal OH groups to the crosslinking agents is usually effected at from −20° to 170° C., preferably from 40° to 120° C.

Methyl glyoxylate is preferably used as the carboxylate containing aldehyde groups, and the resulting polyacetal blocks containing terminal OH groups are preferably linked to divinylated diols of 2 to 6 carbon atoms, divinylated polyalkylene glycols or divinylated polytetrahydrofurans. The polyalkylene glycols and the polytetrahydrofurans preferably have molecular weights of from 100 to 2000. As stated above, polymers having high molecular weights are obtained in the reaction of the polyacetals containing terminal OH groups.

After the linking reaction, the polymers obtainable according to the invention and containing polyacetal blocks, preferably the methyl and ethyl glyoxylates linked with crosslinking agents, are treated with bases in order to convert the ester groups into the salts or into the free acids. In 1% strength aqueous solution in the form of the sodium salt at a pH of 11, the novel polymers containing polyacetal blocks have Fikentscher K values of from 8 to 100. Said polymers are readily hydrolyzable and biodegradable at a pH below 7. They are suitable, for example, as additives in phosphate-free and reduced-phosphate detergents and cleaning agents and as scale inhibitors. They may also be used as dispersants for pigments, in particular for dispersing clay minerals, ion oxides, titanium dioxide and chalk.

Reduced-phosphate detergents are to be understood as meaning detergent formulations whose phosphate content is less than 25% by weight, based on sodium triphosphate.

The compositions of the detergent and cleaning agent formulations may differ very greatly. Detergent and cleaning agent formulations usually contain from 2 to 50% by weight of surfactants and, if required, builders. These values apply both to liquid and to powder detergent and cleaning agent formulations. Examples of the composition of detergent formulations which are commonly used in Europe, in the USA and in Japan are to be found, for example, in Chemical and Eng. News, 67 (1989), 35, in tabulated form. Further information on the composition of detergents and cleaning agents is given in WO-A-90/13581 and in Ullmanns Encyklopadie der technischen Chemie, Verlag Chemie, Weinheim 1983, 4th edition, pages 63–160. Other detergent formulations of interest are those which contain up to 60% by weight of an alkali metal silicate and up to 10% by weight of a polyacetal prepared according to the invention.

The detergents may, if required, also contain a bleach, for example sodium perborate, which, if used, may be present in amounts of up to 30% by weight in the detergent formulation. The detergents and cleaning agents may, if required, contain further conventional additives, for example complexing agents, opacifiers, optical brighteners, enzymes, perfume oils, color transfer inhibitors, graying inhibitors and/or bleach activators and zeolite.

Preferably after hydrolysis with bases, such as sodium hydroxide solution, potassium hydroxide solution, ethanolamine, triethanolamine or morpholine, the polymers containing polyacetal blocks and linked with crosslinking agents are used in detergents and cleaning agents in amounts of from 0.5 to 20, preferably from 2 to 10, % by weight.

The hydrolyzed and neutralized polymers containing polyacetal blocks are also suitable as dispersants for finely divided substances, for example clays, chalk, calcium carbonate, titanium dioxide, iron oxides, kaolins, alumina, cement and oxidic glazes for ceramic purposes. When used as dispersants, amounts of from 0.02 to 5, preferably from 0.2 to 2, % by weight, based on finely divided substances, are usually necessary.

The novel polymers are furthermore used as scale inhibitors, for example in seawater desalination plants, in steam generation or in cooling water circulations. The scale inhibitors are usually used in amounts of from 0.1 to 1000 ppm, preferably from 1 to 500 ppm.

The percentages in the Examples are by weight and the K value of the polymers containing polyacetal blocks was measured in 1% strength aqueous solution of the sodium salt of the polymer at 25° C. at pH 11 according to H. Fikentscher (cf. Cellulose-Chemie, 13 (1932), 58–64 and 71–74).

EXAMPLE 1

In a single-neck flask having a capacity of 100 ml and equipped with a magnetic stirrer and an apparatus for working under an inert atmosphere, 8.8 g (100 mmol) of methyl glyoxylate and 8.8 g (86 mmol) of butanediol formal and 4.5 ml of dichloromethane were initially taken under a nitrogen stream and cooled to 5° C. 20 µl of boron trifluoride etherate were then added to the mixture, stirring was carried out for 1.5 hours at 5° C., 4.5 g (5 ml, 31.8 mmol) of 1,4-butanediol divinyl ether were then added and the mixture was left at room temperature for 20 hours. Thereafter, 10 ml of 1 N sodium hydroxide solution and 4 ml of acetone were added, the reaction mixture was stirred for 5 minutes at 5° C. and the volatile components were then distilled off under reduced pressure at 40° C. The reaction product was hydrolyzed by adding 20 ml of 10 N sodium hydroxide solution, and the polymer was then precipitated from an acetone/methanol mixture (weight ratio 1:1). The yield was 71%, based on the sodium salt of the copolymer. The neutralized copolymer had a K value of 42 (measured in 1% strength aqueous solution).

Comparative Example 1

In the apparatus described in Example 1, 4.5 ml of dichloromethane, 8.8 g (100 mmol) of methyl glyoxylate and 8.8 g (86 mmol) of butanediol formal were initially taken under an argon stream and cooled to 5° C. 20 µl of boron trifluoride etherate were added to this mixture, thus initiating the polymerization. The reaction mixture was stirred for 1.5 hours at 5° C., 0.31 ml (459 mg, 4 mmol) of trifluoroacetic acid and 3.0 ml (2.3 g 32 mmol) of ethyl vinyl ether were then added, the reaction mixture was stirred first for 30 minutes at 5° C. and then for 5 hours at room temperature and the mixture was then left to stand for 20 hours at room temperature. The reaction mixture was then cooled to 5° C., 10 ml of 1 N sodium hydroxide solution were added and stirring was carried out for 5 minutes. Thereafter, the volatile components were removed under reduced pressure at room temperature and the viscous mass was then hydrolyzed by adding 20 ml of 10 N sodium hydroxide solution. The hydrolyzed copolymer was precipitated from a 9:1 acetone/methanol mixture. The copolymer was stirred in methanol and then dried. The yield was 28%, based on the sodium salt of the copolymer. The hydrolyzed copolymer had a K value of 25 (measured in 1% strength solution in water).

EXAMPLE 2

211 g (2.4 mol) of methyl glyoxylate and 53.9 ml of a 0.1% strength solution of triethylamine in acetonitrile (0.54 mmol) were introduced in the course of 30 minutes at room temperature, simultaneously but separately from one another, under a stream of nitrogen, into the apparatus described in Example 1, and were then stirred for 1 hour at room temperature. The resulting polyacetal having terminal OH groups was divided into two equal parts. 105.5 g (1.2 mol) of this polyacetal were cooled to 5° C., and 1.57 ml (0.02 mol) of trifluoroacetic acid and 45.4 g (0.32 mol) of 1,4-butanediol divinyl ether were added in succession. This mixture was stirred for 45 minutes at 5° C. and then for a further 5 hours at room temperature. After a further 15 hours, 20 ml of 1 N sodium hydroxide solution were added to the reaction mixture at 5° C., and the volatile components were distilled off and hydrolysis was then effected with 125 ml of 10 N sodium hydroxide solution (1.25 mol). The product was precipitated from a mixture of equal amounts of methanol and acetone. The yield of the sodium salt of the polymer containing polyacetal blocks was 80%. A 1% strength aqueous sodium salt solution of the polymer had a K value of 21.

Comparative Example 2

1.57 ml (0.02 mol) of trifluoroacetic acid and 23.1 g (0.32 mol) of ethyl vinyl ether were added, at 5° C. under a nitrogen stream, to the second half of the polyacetal described in Example 2 and having terminal OH groups. This mixture was stirred for 45 minutes at 5° C. and then for a further 5 hours at room temperature.

After a further 15 hours, 20 ml of 1 N sodium hydroxide solution were added to the reaction mixture at 5° C., the volatile components were distilled off and hydrolysis was then effected with 125 ml of 10 N sodium hydroxide solution (1.25 mol). The product was precipitated from a mixture of equal amounts of methanol and acetone. The yield of the sodium salt of the polymer was 78% and the K value was 13 (in 1% strength aqueous solution).

In order to obtain information about the efficiency of the polymers in detergents, their efficiency with regard to dispersing clay was tested. The dispersing capacity of polyelectrolytes can be evaluated in a simple manner by the clay dispersing test (CD test) described below.

CD test

Finely milled china clay SPS 151 is used as a model for particulate dirt. 1 g of clay is finely dispersed in 98 ml of water in the course of 10 minutes in a 100 ml cylinder while adding 1 ml of a 1% strength sodium salt solution of the polyelectrolyte. Immediately after stirring, a 2.5 ml sample is taken from the center of the cylinder and, after dilution to 25 ml, the turbidity of the dispersion is determined using a turbidimeter. After the dispersion has been left to stand for 30 and 60 minutes, further samples are taken and the turbidity is determined as above. The turbidity of the dispersion is expressed in NTU (nephelometric turbidity units). The less the dispersion settles out during storage, the higher are the measured turbidity values and the more stable is the dispersion. The dispersion constant, which describes the behavior of the sedimentation process as a function of time, is determined as a second physical parameter. Since the sedimentation process can be described approximately by a monoexponential time law, $\tau$ gives the time in which the turbidity decreases to 1/e th of the initial state at t=0.

The higher a T value, the more slowly the dispersion settles out.

The turbidity values are stated in NTU (nephelometric turbidity units):

|  | Turbidity values after | | | |
| --- | --- | --- | --- | --- |
|  | t = 0 | t = 30 min | t = 60 | $\tau$ |
| Example 1 | 770 | 610 | 530 | 167 |
| Comparative Example 1 | 720 | 400 | 360 | 139 |

We claim:

1. A polymer containing polyacetal blocks prepared by:

polymerizing at least one carboxylate monomer containing an aldehyde group in the presence of an initiator, thereby preparing a polyacetal; and reacting the polyacetal with an at least bifunctional cross-linking agent selected from the group consisting of the polyvinyl ethers, diepoxides, diesters, anhydrides selected from the group consisting of maleic anhydride, succinic anhydride, butanetetracarboxylic dianhydride and benzenetetracarboxylic anhydride, dinitriles, compounds which contain one ester and one amido group and compounds which have two functional groups selected from the group consisting of acylchloride, amido and imido ester groups, thereby cross-linking the polyacetal.

2. The polymer of claim 1, wherein the polyacetal block contains up to 50 mol % of monomer units derived from a copolymerizable monomer selected from the group consisting of the $C_{1-10}$ aldehydes, $C_{2-4}$-alkylene oxides, epihalohydrins, cyclic formals derived from diols, cyclic polymers of formaldehyde and epoxy succinic acid.

3. The polymer of claim 1, wherein the mol ratio of polyacetal blocks to cross-linking agent ranges from 1:2 to 1:1.001.

4. The polymer of claim 1, wherein the pendent ester groups on the polymerized carboxylate monomer units are hydrolyzed to the acid or salt form of the polyacetal.

5. The polymer of claim 1, wherein said aldehyde group containing carboxylate is methyl glyoxylate, ethyl glyoxylate, n-propyl glyoxylate, isopropyl glyoxylate, n-butyl glyoxylate, isobutyl glyoxylate, stearyl glyoxylate or palmityl glyoxylate.

6. A method for preparing polyacetal blocks, comprising:

polymerizing at least one carboxylate monomer containing an aldehyde group in the presence of an initiator, thereby preparing a polyacetal; and reacting the polyacetal with an at lest bifunctional cross-linking agent selected from the group consisting of polyvinyl ethers, diepoxides, diesters, anhydrides selected from the group consisting of maleic anhydride, succinic anhydride, butanetetracarboxylic dianhydride and benzenetetracarboxylic dianhydride, dinitriles, compounds which contain one ester and one amido group or compounds having two functional groups selected from acylchloride, amido and imido ester groups, thereby cross-linking the polyacetal.

7. The method claim 6, which further comprises polymerizing up to 50 mol % of a copolymerizable monomer selected from the group consisting of $C_{1-10}$-aldehydes, $C_{2-4}$-alkylene oxides, epihalohydrins, cyclic formals derived from diols, cyclic polymers of formaldehyde and epoxy succinic acid with said carboxylate monomer containing an aldehyde group.

8. The method of claim 6, wherein the mol ratio of polyacetal block reacted with said cross-linking agent ranges from 1:2 to 1:1.001.

9. The method of claim 6, which further comprises hydrolyzing any pendent ester groups on the polymerized carboxylate monomers to the acid or salt form.

10. The process of claim 6, wherein said aldehyde group containing carboxylate monomer is the ester of a $C_{1-4}$-aliphatic alcohol and glyoxylic acid, and the cross-linking agent is a divinyl ether, diepoxide, anhydride, dinitrile, diester, diamide, or combination thereof.

11. The process of claim 6, wherein said aldehyde group containing carboxylate is methyl glyoxylate and said crosslinking agent is a divinylated diol of 2–6 carbon atoms, divinylated polyalkylene glycol or divinylated polytetrahydrofuran.

12. The process of claim 6, wherein said initiator is an amine, the 2-hydroxypyridine-$H_2O$ complex, a strong Lewis acid, $SbF_5$, $PF_5$, $P_2O_5$, tin chloride, tin alkyls, titanium halides, titanium alkyls, $CF_3CO_2H$, alkali metal alcoholates, BuLi, a Grignard compound, $K_2CO_3$, sodium diethylmalonate, sodium dimethylmalonate, or sodium diethylmethylmalonate.

13. The process of claim 6, wherein the amount of said initiator ranges from 0.0001 to 15 percent by weight.

14. The process of claim 6, wherein the polymerization of aldehyde group containing carboxylate monomer is conducted at a temperature of −100° to 100° C.

15. The process of claim 14, wherein said polymerization temperature ranges from −70° to 80° C.

16. A phosphate-free detergent or phosphate detergent containing less than 25% by wt. phosphate, which comprises a polymer containing polyacetal blocks as claimed in claim 1, and a detergent or surfactant.

* * * * *